US012734468B2

(12) United States Patent
Chernov

(10) Patent No.: US 12,734,468 B2
(45) Date of Patent: Sep. 15, 2026

(54) AUTOMATIC SHUTOFF VALVE FOR A WATER FILTER ASSEMBLY

(71) Applicant: Haier US Appliance Solutions, Inc., Wilmington, DE (US)

(72) Inventor: Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 288 days.

(21) Appl. No.: 18/591,556

(22) Filed: Feb. 29, 2024

(65) Prior Publication Data

US 2025/0276261 A1 Sep. 4, 2025

(51) Int. Cl.

| | |
|---|---|
| ***B01D 35/157*** | (2006.01) |
| ***C02F 1/00*** | (2023.01) |
| ***F16K 31/00*** | (2006.01) |
| ***F25D 23/12*** | (2006.01) |

(52) U.S. Cl.

CPC .......... *B01D 35/1573* (2013.01); *C02F 1/003* (2013.01); *F16K 31/002* (2013.01); *F25D 23/126* (2013.01); *B01D 2201/16* (2013.01); *C02F 2201/005* (2013.01); *C02F 2307/12* (2013.01); *F25D 2323/121* (2013.01)

(58) Field of Classification Search

None

See application file for complete search history.

(56) References Cited

U.S. PATENT DOCUMENTS

| | | | |
|---|---|---|---|
| 4,698,164 A | 10/1987 | Ellis | |
| 5,144,775 A | 9/1992 | Bakanowsky, III | |
| 5,873,995 A | 2/1999 | Huang | |
| 5,882,507 A | 3/1999 | Tanner et al. | |
| 5,997,734 A | 12/1999 | Koski et al. | |
| 6,428,708 B1 | 8/2002 | Halemba et al. | |
| 7,182,672 B2 | 2/2007 | Tunaboylu et al. | |
| 7,384,496 B2 | 6/2008 | Cote et al. | |
| 8,002,235 B2 | 8/2011 | Vyawahare et al. | |
| 8,944,284 B2 | 2/2015 | Milan | |
| 9,297,575 B1 * | 3/2016 | Gardner | F25D 31/002 |
| 9,620,996 B2 | 4/2017 | Zeine et al. | |

(Continued)

FOREIGN PATENT DOCUMENTS

| | | | |
|---|---|---|---|
| CN | 103313766 A * | 9/2013 | B01D 35/147 |
| CN | 102087333 B | 1/2016 | |

(Continued)

OTHER PUBLICATIONS

CDC: Fact Sheet About What to Do During a Boil Water Advisory, accessed chromeextension://efaidnbmnnnibpcajpcglclefindmkaj/https://www.cdc.gov/healthywater/emergency/dwa-comm-toolbox/before/tools/Fact-Sheet-About-What-to-Do-During-BWA-508.pdf on Feb. 29, 2024, 4 pages.

*Primary Examiner* — Krishnan S Menon

(74) *Attorney, Agent, or Firm* — Dority & Manning, P.A.

(57) ABSTRACT

A water filter assembly for a domestic appliance includes a filter housing defining a filter chamber, a feed water inlet, and a treated water outlet; a filter element received within the filter chamber defining a feed water chamber and a treated water chamber; a valve plug positioned within the filter housing; and an actuator in operable contact with the valve plug, the actuator being a shape-memory material configured to adjust from a first shape to a second shape in response to a stimulus.

20 Claims, 9 Drawing Sheets

(56) References Cited

U.S. PATENT DOCUMENTS

| | | | | |
|---|---|---|---|---|
| 9,839,868 | B2 | 12/2017 | Fritze | |
| 10,406,461 | B2 | 9/2019 | Subrahmanya et al. | |
| 10,450,203 | B2 | 10/2019 | Schuster | |
| 10,786,768 | B2 | 9/2020 | Fritze | |
| 10,843,107 | B2 | 11/2020 | Bippus et al. | |
| 10,926,206 | B1 | 2/2021 | Chernov et al. | |
| 10,946,319 | B2 | 3/2021 | Subrahmanya et al. | |
| 11,025,447 | B2 | 6/2021 | Ebrom et al. | |
| 2011/0061748 | A1 * | 3/2011 | Mous ........................ | F17D 5/02 137/544 |
| 2016/0075566 | A1 | 3/2016 | Froelicher | |
| 2016/0304359 | A1 | 10/2016 | Cur et al. | |
| 2018/0008916 | A1 | 1/2018 | Krause et al. | |
| 2021/0077927 | A1 | 3/2021 | Fritze | |
| 2022/0154989 | A1 | 5/2022 | Kim et al. | |
| 2023/0032298 | A1 * | 2/2023 | Thornton ................ | A24F 40/20 |

FOREIGN PATENT DOCUMENTS

| | | | |
|---|---|---|---|
| CN | 205127526 | U | 4/2016 |
| CN | 107077632 | B | 12/2018 |
| CN | 111442602 | A | 7/2020 |
| DE | 102006026688 | A1 | 12/2007 |
| EP | 3242376 | B1 | 8/2019 |
| GB | 2240081 | A | 7/1991 |
| JP | S60155072 | A | 8/1985 |
| KR | 100296727 | B1 | 7/2001 |
| KR | 101063534 | B1 | 9/2011 |
| KR | 101566282 | B1 | 11/2015 |
| KR | 20170091984 | A | 8/2017 |
| WO | WO2010118519 | A1 | 10/2010 |
| WO | WO2018235030 | A1 | 12/2018 |

* cited by examiner

AUTOMATIC SHUTOFF VALVE FOR A WATER FILTER ASSEMBLY

FIELD OF THE INVENTION

The present subject matter relates generally to water filter assemblies, and more particularly to shut off mechanisms within water filter assemblies.

BACKGROUND OF THE INVENTION

Many known household appliances include water filters or water filter assemblies to remove particulates, dissolved solids, tastes, odors, or other undesirable contaminants of a water supply. Typically, the water filters include consumable filter elements that are replaced at the end of a useful lifetime of the filer. Commonly, the useful life of the filter element is determined by the filter's time in service or the volume of water that has been filtered. Additionally, certain public events such as boil water advisories or other health advisories may render the filter elements compromised or unable to perform required filtering duties.

However, drawbacks exist in current appliances regarding properly replacing used filters. For instance, many known appliances provide a notification such as a warning light to change the filter after a certain amount of time has passed or a certain volume of water has been cycled through the filter assembly. Moreover, existing methods for restricting flow of water out of the water filter assembly can be ineffective, reversed, or unpredictable, with some requiring extensive equipment leaving less room for filtration material and subsequently reducing the life of the filter.

Accordingly, a water filter assembly which obviates one or more of the above-mentioned drawbacks would be beneficial. In particular, a water filter assembly with an automatic shutoff valve and actuator would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a water filter assembly is provided. The water filter assembly may include a filter housing defining a filter chamber, a feed water inlet, and a treated water outlet; a filter element received within the filter chamber defining a feed water chamber and a treated water chamber; a valve plug positioned within the filter housing, the valve plug being movable from an unplugged position to a plugged position; and an actuator assembly in operable contact with the valve plug, wherein the actuator assembly includes a shape-memory material configured to adjust from a first shape to a second shape in response to an electrical stimulus, and wherein the valve plug is in the unplugged position when the shape-memory material is in the first shape and the valve plug moves to the plugged position when the shape-memory material is transformed into the second shape.

In another exemplary aspect of the present disclosure, a domestic appliance is provided. The domestic appliance may include a cabinet forming a receiving space; a water supply inlet provided on the cabinet and through which water is supplied to the receiving space from an external water supply; and a water filter assembly in fluid communication with the external water supply. The water filter assembly may include a filter housing defining a filter chamber, a feed water inlet, and a treated water outlet; a filter element received within the filter chamber defining a feed water chamber and a treated water chamber; a valve plug positioned within the filter housing; an actuator assembly in operable contact with the valve plug, wherein the actuator assembly includes a shape-memory material configured to adjust from a first shape to a second shape in response to a stimulus; an electric power supply in operable communication with the actuator assembly; and a controller operably connected to the electric power supply, the controller being configured to perform an operation. The operation may include receiving an input signal relating to the water filter assembly; determining that the water filter assembly is compromised after receiving the input signal relating to the water filter assembly; and directing the electric power supply according to a predetermined level to produce the stimulus in response to determining that the water filter assembly is compromised, wherein the valve plug is moved from an open position to a closed position when the actuator assembly adjusts from the first shape to the second shape in response to the stimulus.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
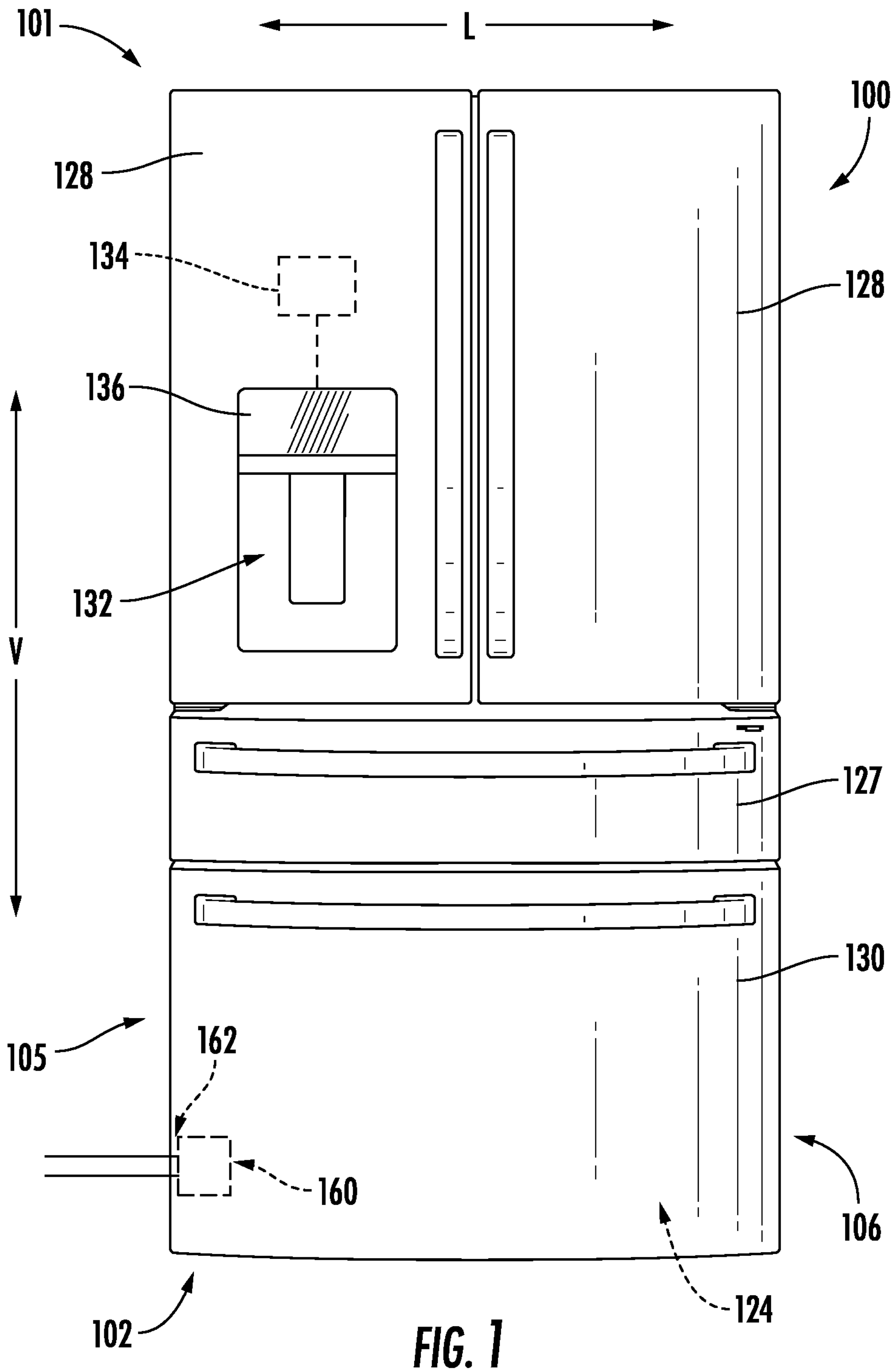
FIG. 1 provides a front view of a refrigerator appliance according to an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term “or” is generally intended to be inclusive (i.e., “A or B” is intended to mean “A or B or both”). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms “a,” “an,” and “the” include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as “generally,” “about,” “approximately,” and “substantially,” are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., “generally vertical” includes forming an angle of up to ten degrees in any direction, e.g., clockwise or counterclockwise, with the vertical direction V.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
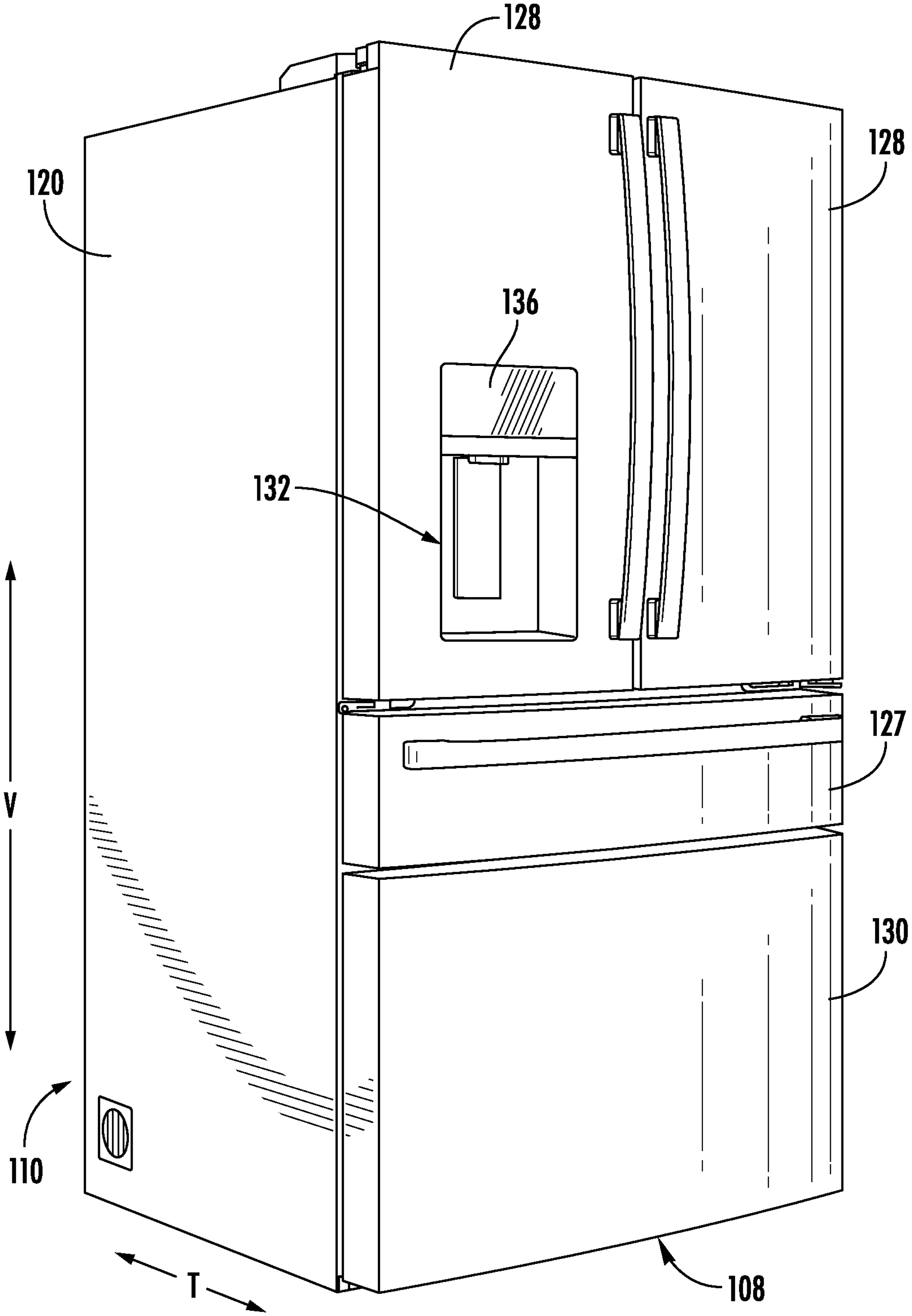
FIG. 2 provides a perspective view of the refrigerator appliance of FIG. 1.
Figure 3:
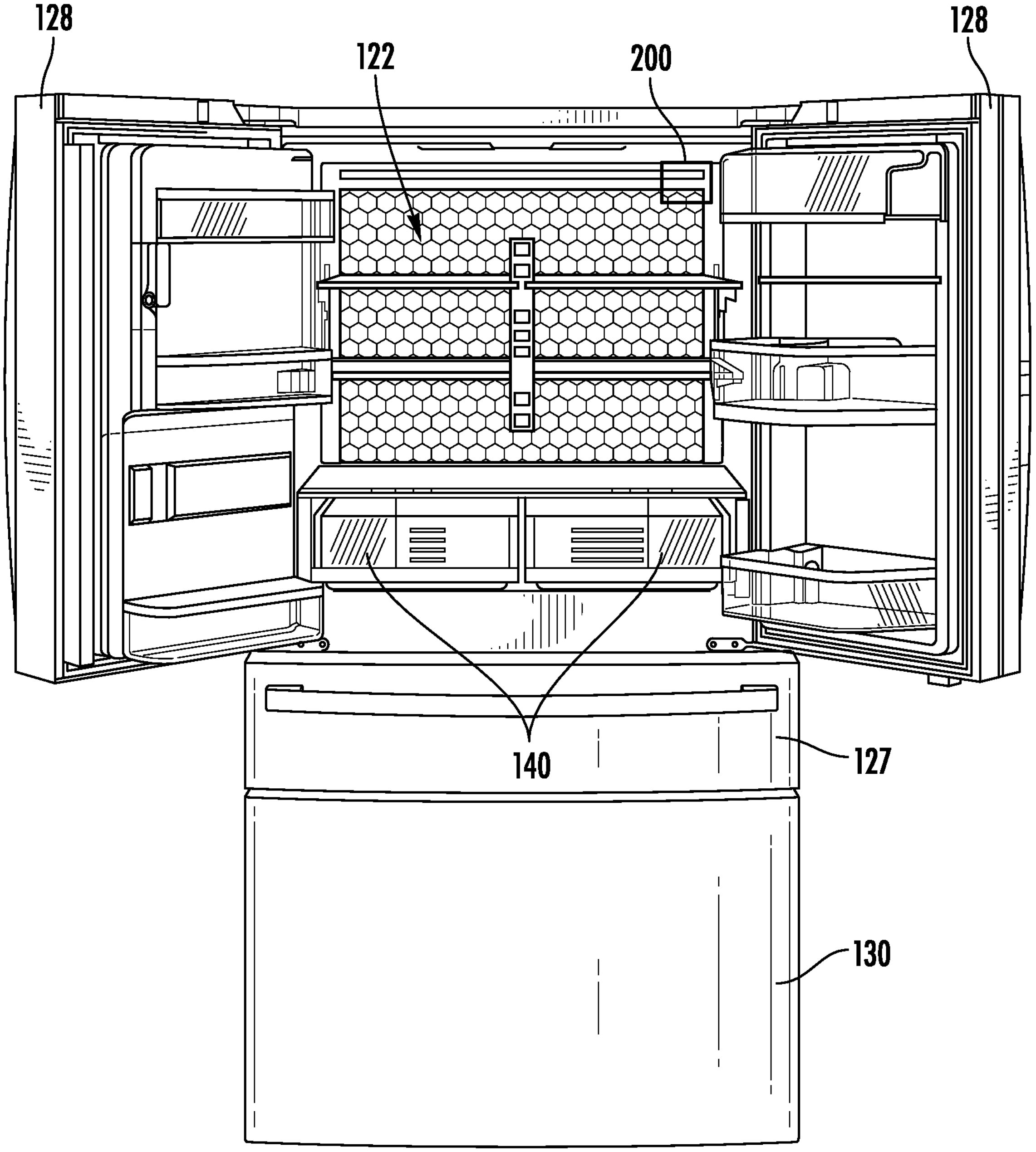
FIG. 3 provides a front view of the refrigerator appliance of FIG. 1 with doors in an open position.

FIG. 1 is a front view of an exemplary embodiment of a refrigerator appliance 100. FIG. 2 is a perspective view of the refrigerator appliance 100. FIG. 3 is a front view of the refrigerator appliance 100 with fresh food doors 128 thereof in an open position. Refrigerator appliance 100 extends between a top 101 and a bottom 102 along a vertical direction V. Refrigerator appliance 100 also extends between a first side 105 and a second side 106 along a lateral direction L. As shown in FIG. 2, a transverse direction T may additionally be defined perpendicular to the vertical and lateral directions V, L. Refrigerator appliance 100 extends along the transverse direction T between a front portion 108 and a back portion 110.

Refrigerator appliance 100 may include a cabinet or housing 120 defining an upper fresh food chamber 122 (FIG. 3) and a lower freezer chamber or frozen food storage chamber 124 arranged below the fresh food chamber 122 along the vertical direction V. An auxiliary food storage chamber may be positioned between the fresh food storage chamber 122 and the frozen food storage chamber 124, e.g., along the vertical direction V. Because the frozen food storage chamber 124 is positioned below the fresh food storage chamber 122, refrigerator appliance 100 may be generally referred to as a bottom mount refrigerator. In the exemplary embodiment, housing 120 may also define a mechanical compartment (not shown) for receipt of a sealed cooling system (not shown). Using the teachings disclosed herein, one of ordinary skill in the art will understand that the present technology can be used with other types of refrigerators (e.g., side-by-side) or a freezer appliance as well. Consequently, the description set forth herein is for illustrative purposes only and is not intended to limit the technology in any aspect.

Refrigerator doors 128 may each be rotatably hinged to an edge of housing 120 for accessing fresh food chamber 122. It should be noted that while two doors 128 in a “French door” configuration are illustrated, any suitable arrangement of doors utilizing one, two or more doors is within the scope and spirit of the present disclosure. A freezer door 130 may be arranged below refrigerator doors 128 for accessing freezer chamber 124. In the exemplary embodiment, freezer door 130 is coupled to a freezer drawer (not shown) slidably mounted within freezer chamber 124. An auxiliary door 127 may be coupled to an auxiliary drawer which may be slidably mounted within the auxiliary chamber.

Refrigerator appliance 100 may include a valve 160. Valve 160 may selectively allow a flow of water (e.g., from a municipal water supply) into refrigerator appliance 100. Thus, valve 160 may be provided on a water supply inlet 162 of refrigerator appliance 100. Valve 160 may be an electro-mechanical valve, for instance. However, it should be understood that the valve may be any suitable valve, such as a mechanical valve (with an attached servo motor), a solenoid valve, a motor valve, or the like. Valve 160 may selectively open or close according to a signal input from a controller.

Operation of the refrigerator appliance 100 can be regulated by a controller 134 that is operatively coupled to a user interface panel 136. User interface panel 136 may provide selections for user manipulation of the operation of refrigerator appliance 100 to modify environmental conditions therein, such as temperature selections, etc. In some embodiments, user interface panel 136 is proximate a dispenser assembly 132. In response to user manipulation of the user interface panel 136, the controller 134 may operate various components of the refrigerator appliance 100. Operation of the refrigerator appliance 100 may be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated embodiment, the controller 134 is located within the door 128. In such an embodiment, input/output ("I/O") signals may be routed between the controller and various operational components of refrigerator appliance 100. In one embodiment, the user interface panel 136 represents a general purpose I/O ("GPIO") device or functional block. In one embodiment, the user interface 136 includes input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

Using the teachings disclosed herein, one of skill in the art will understand that the present subject matter can be used with other types of refrigerators such as a refrigerator/freezer combination, side-by-side, bottom mount, compact, and any other style or model of refrigerator appliance. Accordingly, other configurations of refrigerator appliance 100 could be provided, it being understood that the configurations shown in the accompanying FIGS. and the description set forth herein are by way of example for illustrative purposes only.

Figure 4:
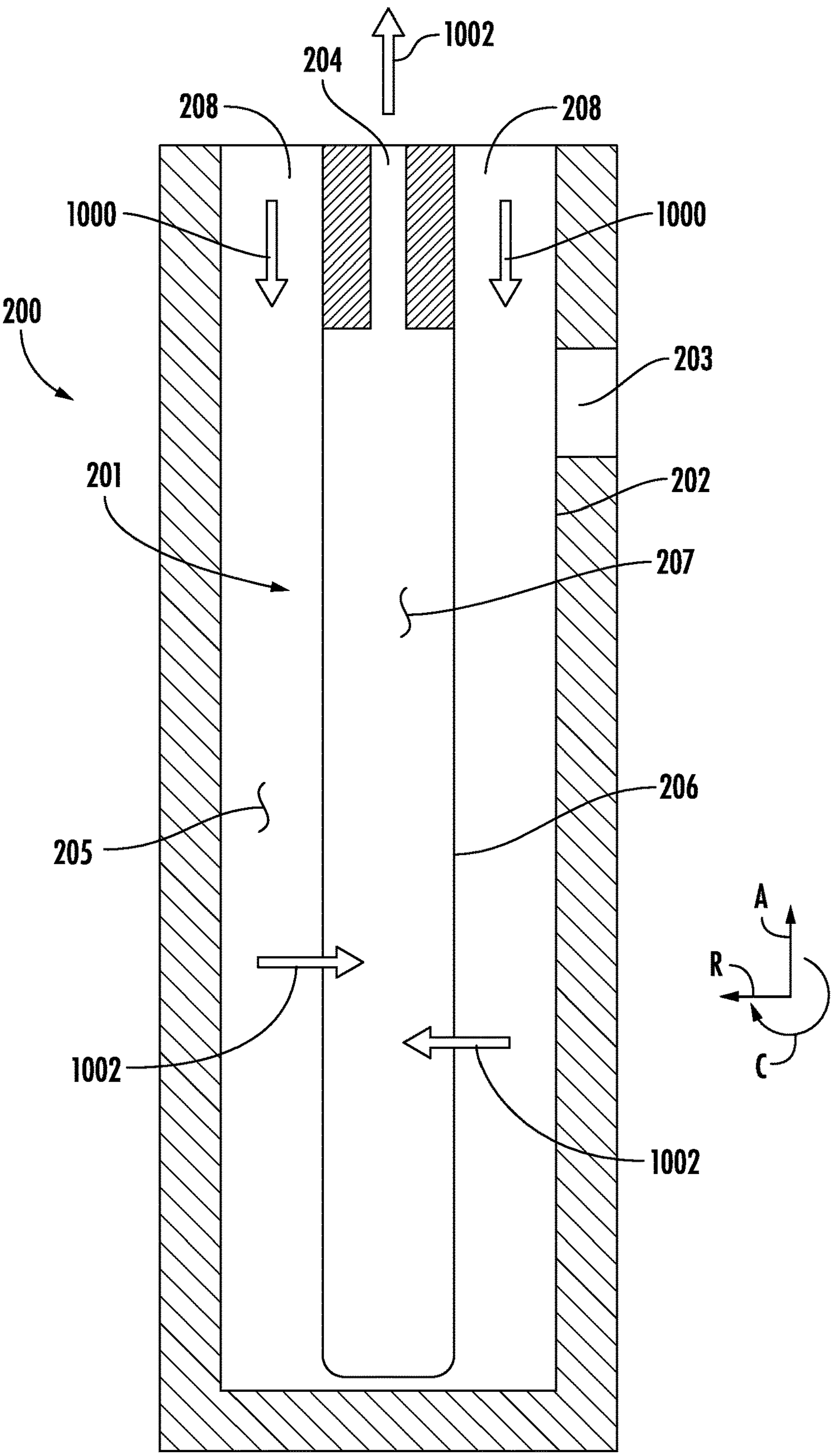
FIG. 4 provides a simplified section view of a water filter with an embedded wireless power receiver according to one or more embodiments of the present disclosure which may be incorporated into a refrigerator appliance such as the exemplary refrigerator appliance of FIG. 1.

In some embodiments, e.g., as illustrated in FIG. 4, the refrigerator appliance 100 includes a water filter (or water filter assembly) 200 connected thereto. For example, the water filter assembly 200 may be coupled to a water supply line (not shown) such that the water filter assembly 200 receives a flow of water 1000, e.g., which may be referred to as raw or unfiltered water, from the water supply line and provides a flow of water 1002, e.g., filtered water, to a portion of the water supply line downstream of the filter 200 and/or various fixtures or components of the refrigerator appliance 100 such as an ice maker, water dispenser, etc. The water filter assembly 200 may include a housing or body 202 which defines a liquid receiving space (or filter chamber) 201 with an inlet (e.g., a feed water inlet) 208 opening through the housing 202 into the filter chamber 201 and an outlet (e.g., a treated water outlet) 204 from the liquid receiving space 201 (e.g., from treated water chamber 207).

As illustrated in FIG. 4, unfiltered water 1000 may flow into filter 200 via inlet 204. The unfiltered water 1000 may flow into a feed water chamber 205. The water may then pass through a filter medium or element 206, e.g., a membrane, activated carbon, or other suitable filter medium including combinations of more than one filter media, thereby producing filtered water 1002. The filtered water 1002 may then be contained within a treated water chamber 207. The filtered water 1002 may then exit the water filter 200 via outlet 204. In additional or alternative embodiments, filter medium 206 may include one or more filter electrodes (e.g., an anode, a cathode, etc.) receiving an electrical current to provide a filter action to the water. The one or more electrodes may be positioned within liquid receiving space 201. For instance, the filter electrodes may perform an electrochemical contaminant reduction within the water to reduce or remove impurities. As will be explained below, electricity for the filter electrodes may be supplied wirelessly (or through mechanical contacts) from refrigerator appliance 100 to water filter 200.

Body 202 may define an electronics compartment 203. In detail, electronics compartment 203 may be fluidly separated from liquid receiving space 201. As shown schematically in FIG. 4, electronics compartment 203 may be formed in body 202 adjacent to liquid receiving space 201. Thus, a portion of body 202 may be positioned between liquid receiving space 201 and electronics compartment 203. Additionally or alternatively, a top portion, a bottom portion, opposite side portions, and a radially outward portion may be defined by body 202. Thus, electronics compartment 203 may be said to be positioned within a shell of water filter 200 (e.g., as defined by body 202).

One or more electronic components may be housed (e.g., positioned) within electronics compartment 203. Thus, the one or more electronic components (described below) may be fluidly isolated from liquid receiving space 201, and thus fluidly isolated from the flow of water received within liquid receiving space 201. Thus, electronics compartment 203 may define an electronics receiving space. In some instances, electronics compartment 203 may be selectively accessible (e.g., by a user). For instance, a liquid tight access door may be provided on body 202 of water filter 200 providing access to electronics compartment 203. According to other embodiments, electronics compartment 203 is sealed with respect to each of liquid receiving space 201 and an ambient atmosphere. As will be described below, water filter 200 may be in wireless communication with refrigerator appliance 100. However, it should be understood that any suitable form of communication may take place between water filter 200 and appliance 100 (e.g., such as wired communication, contact communication, etc.). Accordingly, power or electricity may be supplied to water filter 200 from appliance 100 in any suitable way, and the disclosure is not limited to the examples provided herein.

Figure 5:
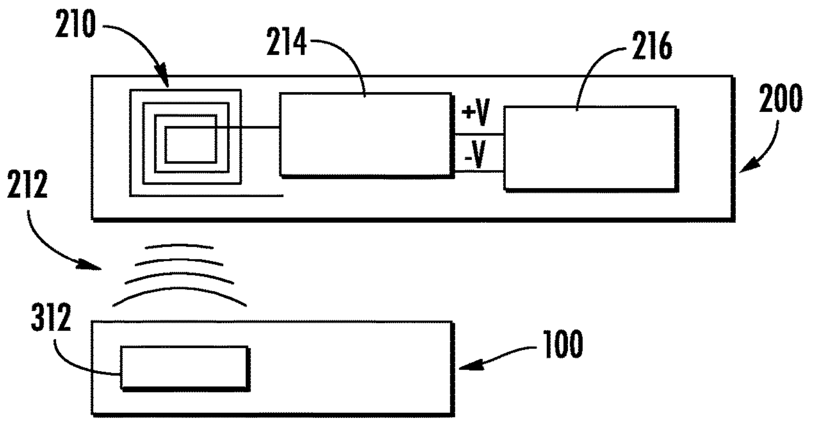
FIG. 5 provides a schematic diagram showing electrical communication between the exemplary refrigerator appliance of FIG. 1 and the exemplary water filter of FIG. 4.

FIG. 5 provides a schematic representation of a water filter (e.g., water filter 200) and a refrigerator appliance (e.g., refrigerator appliance 100). In some embodiments, a wireless power transmitter 312 is provided to supply power to one or more electric devices within refrigerator appliance 100. In particular, wireless power transmitter 312 may be mounted on or within cabinet 120, in operable communication (e.g., wireless or contact-free communication) with water filter 200 to transmit an electromagnetic field thereto, which may then power one or more electronic components. For instance, wireless power transmitter 312 may transmit an electromagnetic field to an antenna (described below) provided within electronics compartment 203. Although power (or electricity) transfer between appliance 100 and water filter 200 is described as being wireless herein, it should be understood that some embodiments may include additional or alternative forms of connectivity, power transfer, or electricity exchange, such as wired connections, contact connections, or the like.

As shown, wireless power transmitter 312 may be physically spaced apart from water filter 200 at discrete portions (e.g., a docking port for water filter 200) of refrigerator appliance 100. When assembled, wireless power transmitter 312 may thus be wirelessly coupled to water filter 200 (e.g., without ever coming into direct or conductive electrical contact with water filter). In turn, an air gap may be maintained between the two. For instance, electronics compartment 203 of water filter 200 may be electrically sealed such that no electrical wires or busses pass through body 202. For example, when water filter 200 is installed within refrigerator appliance 100, no direct physical contact is made between components within electronics compartment 203 and wireless power transmitter 312. Advantageously, a potential failure or leak point may be avoided while still permitting power to be supplied to one or more electrical components provided within water filter 200.

Additionally or alternatively, wireless power transmitter 312 may operate (e.g., emit electromagnetic fields) according to one of a plurality of protocols. The plurality of protocols may include, for instance, a near-field communication (NFC) protocol, a Qi protocol, a radiofrequency identification (RFID) protocol, a laser protocol, a microwave protocol, or the like. It should be understood that the list of potential protocols is not exhaustive, and any suitable wireless protocol may be used. For instance, among the plurality of protocols, wireless power transmitter 312 may emit power charging signals (e.g., for wireless charging of electronic components), wireless authentication signals (e.g., to confirm that water filter 200 includes the capability to receive wireless charging), data transfer signals (e.g., wireless signals including data related to components of water filter 200), or the like.

With reference to FIG. 5, an antenna 210 may be provided within the water filter 200. In particular, antenna 210 may be embedded in housing 202 of water filter 200. For example, in some embodiments, antenna 210 is positioned within electronics compartment 203. Antenna 210 may be configured to receive an electromagnetic field 212 (e.g., emitted by wireless power transmitter 312 within refrigerator appliance 100). Accordingly, antenna 210 may be configured to receive the electromagnetic field according to an associated protocol (e.g., through which wireless power transmitter 312 is operated), as would be understood.

The received electromagnetic field 212 may be converted to a usable signal via a power harvesting circuit 214. In detail, power harvesting circuit 214 may be provided within electronics compartment 203. Power harvesting circuit 214 may be electronically connected with antenna 210. Accordingly, electromagnetic field 212 may be transmitted to power harvesting circuit 214 via one or more electric connections. Power harvesting circuit 214 may then generate an electric current or voltage and transmit the electric current or voltage to an onboard controller. According to some embodiments, the onboard controller is integral with power harvesting circuit 214. However, a separate, dedicated controller may be included within water filter 200 (e.g., within electronics compartment 203).

Generally, wireless power transmitter 312 and antenna 210 may be configured to exchange an electromagnetic field that generates an electrical current. For instance, wireless power transmitter 312 may transmit an electromagnetic field (e.g., as initiated by controller 134) that is received at antenna 210 (which may also be referred to as a wireless power receiver). At antenna 210, an electrical current or voltage may be generated and, subsequently, transmitted to the onboard controller (e.g., through an on-board rectifying circuit or activation circuit). For instance, the electromagnetic field may induce an electrical current at power harvesting circuit 214 that can be received by the onboard controller (e.g., within power harvesting circuit). During operations, the onboard controller may be powered by power harvesting circuit 214.

As would be understood, the wireless power transmitter 312 and power harvesting circuit 214 may be a matched pair of resonant induction coils. Nonetheless, it is understood that any other suitable wireless power transmission method (e.g., inductive coupling, capacitive coupling, etc.) may be used.

As mentioned above, water filter 200 may include one or more electronic components 216. In detail, the one or more electronic components 216 may include a light emitting diode (LED), an electrode (e.g., a filter electrode for performing an ionizing reaction to the water), an electrode life sensor (e.g., to determine a remaining life or efficiency of the electrode), a water volume sensor, a water cycle sensor, or the like. For example, an electrode life sensor may include a voltage sensor on the electrode, a water quality sensor provided adjacent to the electrode, a chemical reaction sensor, or the like. The one or more electronic components may be operably coupled with power harvesting circuit 214 (e.g., via positive and negative voltage connections). Accordingly, the electrical current or voltage generated at power harvesting circuit 214 may be transmitted to the one or more electrical components 216 to provide power thereto. Additionally or alternatively, the one or more electrical components 216 may include a battery (e.g., a rechargeable battery). For instance, power harvesting circuit 214 may have a battery formed integrally therein. Thus, the electrical signal or voltage may be stored within the battery to be delivered to the one or more electrical components 216 at selected times. Additionally or alternatively, the one or more electrical components may include a shutoff valve assembly 220, described in more detail below.

Referring now to FIGS. 6 through 13, shutoff valve assembly 220 will be described in detail. Shutoff valve 220 may define an axial direction A, a radial direction R, and a circumferential direction C. Shutoff valve assembly 220 may be provided within water filter 200. For instance, shutoff valve assembly 220 may operate to selectively shutoff, close off, cap, or otherwise restrict water flow through water filter 200 (e.g., in response to an input stimulus or signal). Accordingly, in some instances, shutoff valve assembly 220 may be a one-way valve. For instance, shutoff valve assembly 220 may move in one direction, such as from an open position to a closed position, as will be described.

Figure 6:
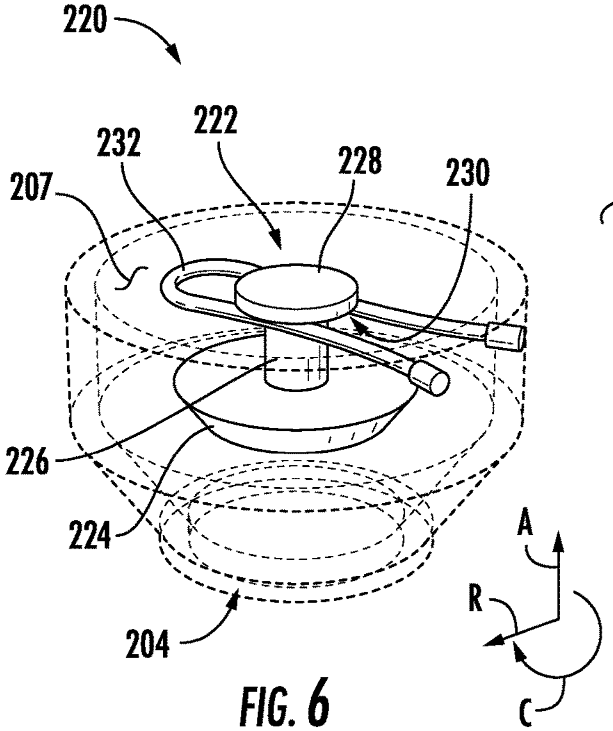
FIG. 6 provides a perspective view of a valve plug and an actuator of the water filter of FIG. 4 according to exemplary embodiments of the present disclosure, with the actuator in a first shape.
Figure 7:
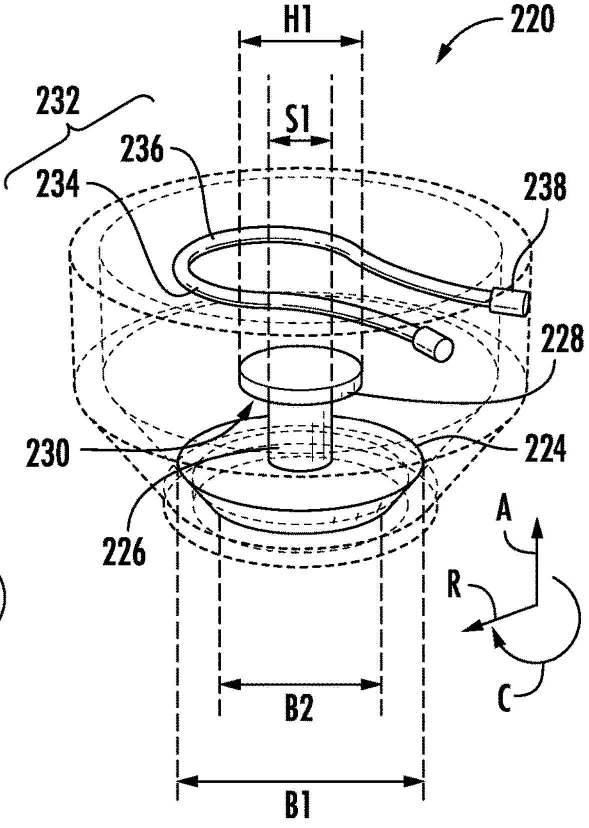
FIG. 7 provides a perspective view of the valve plug and actuator of FIG. 6 according to exemplary embodiments of the present disclosure, with the actuator in a second shape.
Figure 8:
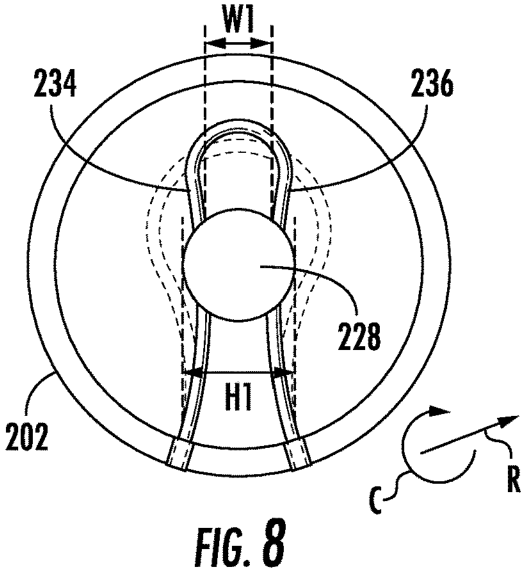
FIG. 8 provides a top view of the valve plug and actuator of FIG. 6 in the first shape.
Figure 9:
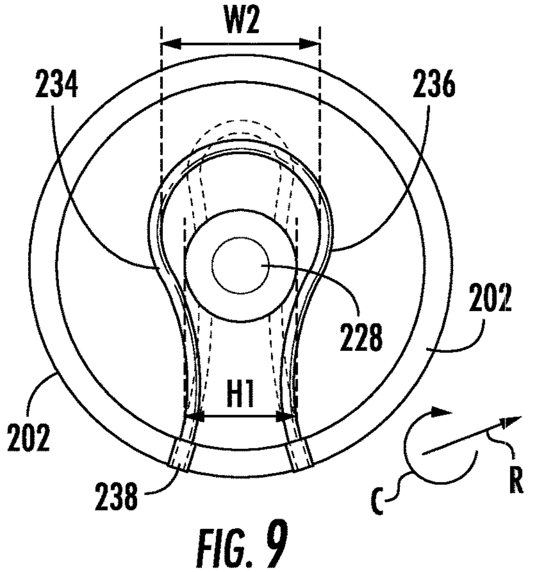
FIG. 9 provides a top view of the valve plug and actuator of FIG. 7 in the second shape.

FIGS. 6 and 8 show shutoff valve assembly 220 in a first position, and FIGS. 7 and 9 show shutoff valve assembly 220 in a second position. Referring first to FIGS. 6 and 8, shutoff valve assembly 220 may include a valve plug 222. Valve plug 222 may be positioned within filter body 202. For instance, valve plug 222 may be positioned within treated water chamber 207. Additionally or alternatively, valve plug 222 may be positioned adjacent to treated water outlet 204. For instance, valve plug 222 may be suspended above treated water outlet 204 (e.g., by an actuator, described below). Thus, while water filter 200 is operational (e.g., functioning or performing filtration and releasing filtered water), valve plug 222 may not restrict the flow of filtered water 1002 out via treated water outlet 204.

Valve plug 222 may include a plug base 224. Plug base 224 may be conical in shape, tapering towards treated water outlet 204. For instance, a top of plug base 224 may define a first base diameter B1 and a bottom of plug base 224 may define a second base diameter B2. Second base diameter B2 may be shorter than first base diameter B1. Similarly, treated water outlet 204 may have a funnel shape corresponding to the shape of plug base 224. Accordingly, as will be described further below, when valve plug 222 is released, treated water outlet 204 may be plugged so as to restrict water from flowing out of water filter 200. Further, it should be noted that plug base 224 as described herein is provided by way of example only, and plug base 224 may have any suitable shape (e.g., cylindrical, squared, tapered, trapezoidal, etc.).

Valve plug 222 may include a stem 226. Stem 226 may extend from plug base 224 (e.g., along the axial direction A). For instance, stem 226 may extend from the top of plug base 224 along the axial direction A. Stem 226 may define a stem diameter S1. Stem diameter S1 may be less than each of first base diameter B1 and second base diameter B2. Stem 226 may be positioned at or near a radial center of plug base 224. However, stem 226 as described herein is provided by way of example only, and stem 226 may have any suitable shape or location with respect to plug base 224. For instance, two or more stems 226 may be incorporated in certain embodiments.

Valve plug 222 may include a plug head 228. Plug head 228 may be provided at a distal end of stem 226 (e.g., opposite plug base 224). Thus, stem 226 may connect plug base 224 with plug head 228. Plug head may define a head diameter H1. Head diameter H1 may be greater than stem diameter S1. For instance, plug head 228 may extend (e.g., along the radial direction R) away from stem 226. Plug head 228 may thus be cylindrical in shape. However, plug head 228 as described herein is provided by way of example only, and plug head 228 may have any suitable shape or location with respect to stem 226.

Plug head 228 may define an under surface 230. For instance, stem 226 may extend from under surface 230 of plug head 228. Under surface 230 may face plug base 224. Thus, under surface 230 may be provided radially around stem 226. As will be described below, under surface 230 may selectively rest upon an actuator when in the first position (e.g., as shown in FIG. 6).

Shutoff valve assembly 220 may include an actuator (or actuator assembly) 232. Actuator 232 may be in operable contact with valve plug 222. In detail, actuator 232 may hold valve plug 222 in the first position (FIG. 6). As such, actuator 232 may be positioned around valve plug 222 (e.g., along the circumferential direction C). Actuator 232 may be or include a shape-memory material. For instance, a material of actuator 232 may be configured to change shape in response to a stimulus (e.g., an electrical stimulus). Thus, as will be described, actuator 232 may have, define, or otherwise be in a first shape corresponding to the first position of valve plug 222 (FIGS. 6 and 8). Actuator 232 may then selectively change to a second shape corresponding to the second position of valve plug 222 (FIGS. 7 and 9).

As used herein, the term "shape-memory material" includes various materials including alloys also known in the art as smart metals, memory metals, memory alloys, muscle wires, or smart alloys whose physical shape or length changes with temperature changes. For instance, shape-memory alloys (SMAs) may include a family of metal alloys that possess shape memory and/or pseudoelasticity effects. The shape memory effect may be an ability of a deformed material to return to an original or "trained" shape in response to certain environmental conditions. For at least one example, when a temperature of an exemplary SMA is at an "operating range" (e.g., below an Austenite Start Temperature [$A_s$]), the SMA is soft and pliable and may be easily deformed without an immediate elastic response. Once heated to a temperature above $A_s$, the SMA may initiate a transformation to the trained shape. The transformation may be deemed complete once the temperature is above a transformation temperature (Active Austenite Finish Temperature [$A_f$]). The difference between $A_s$ and $A_f$ may be between about 15° C. and about 20° C. However, the difference between $A_s$ and $A_f$ may vary depending on the material composition and heat treatment of the SMA. After the transformation, the shape may remain in the trained shape unless or until an external load is applied thereto.

For example, actuator 232 may have a straight, shorter, or more slender length at a first temperature (e.g., an ambient temperature), as shown in FIG. 8, and a curved, bulbous, or longer length at higher temperatures (e.g., at an actuation temperature such as $A_f$), as shown in FIG. 9. The curving or lengthening of actuator 232 at higher temperatures may thus move at least a portion actuator 232 with respect to valve plug 222. The shape-memory material may be made from various alloy combinations that exhibit the desired changes at the anticipated temperatures. For example, the shape-memory material may include copper-zinc-aluminum-nickel, copper-aluminum-nickel, nickel-titanium, or other alloys of zinc, copper, gold, and iron.

Figure 10:
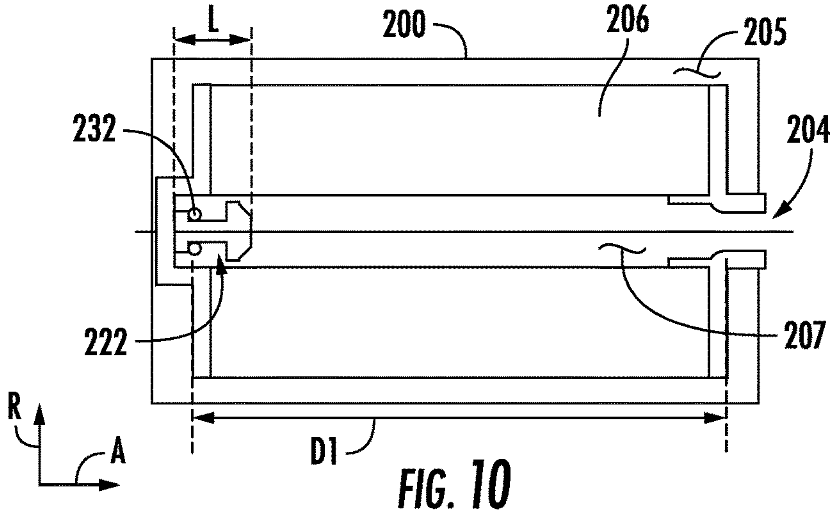
FIG. 10 provides a side schematic view of a water filter according to exemplary embodiments of the present disclosure, with the actuator in the first shape and the valve plug in a first position.

Actuator 232 may thus be a shape-memory wire. Actuator 232 may include a first leg 234 and a second leg 236. First leg 234 may be disposed on a first side of valve plug 222 while second leg is disposed on a second side of valve plug (e.g., opposite the first side). In some instances, actuator 232 may be described as surrounding or at least partially encircling valve plug 222. Moreover, actuator 232 may extend predominantly along the radial direction R and the circumferential direction C (e.g., within treated water chamber 207). Additionally or alternatively, actuator 232 may be spaced a predetermined distance from treated water outlet 204 (e.g., along the axial direction A). In particular, a distance D1 between actuator 232 and treated water outlet 204 may be greater than a total length L of valve plug 222 (e.g., as shown in FIG. 10).

With specific reference to FIGS. 6 and 8, actuator 232 is in the first shape. As such, first leg 234 and second leg 236 may be positioned relatively close to each other. In detail, a distance W1 between first leg 234 and second leg 236 may be less than head diameter H1 of plug head 228. As can be seen, each of first leg 234 and second leg 236 may thus be positioned underneath plug head 228 (e.g., along the axial direction A). In other words, first leg 234 and second leg 236 may be in contact with under surface 230 of plug head 228. Additionally or alternatively, each of first leg 234 and second leg 236 may be provided between plug head 228 and plug base 224. Actuator 232 may thus retain valve plug 222 in the first position (FIGS. 6 and 10) when actuator 232 is in the first shape.

Figure 11:
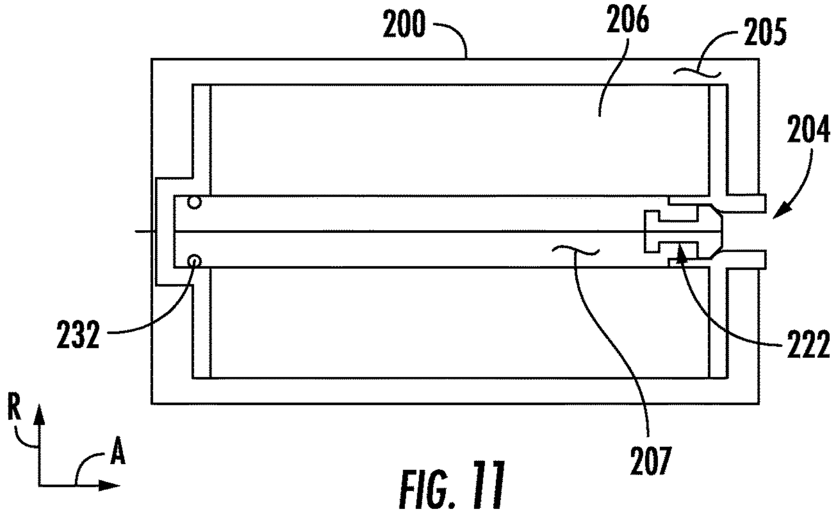
FIG. 11 provides a side schematic view of the water filter of FIG. 10 with the actuator in the second shape and the valve plug in a second position.

With specific reference to FIGS. 7 and 9, actuator 232 is in the second shape. As such, first leg 234 and second leg 236 may be positioned relatively far away from each other. In detail, a distance W2 between first leg 234 and second leg 236 may be greater than head diameter H1 of plug head 228. As can be seen, each of first leg 234 and second leg 236 may be moved out from underneath plug head 228 (e.g., outward along the radial direction R). In other words, plug head 228 may no longer be restrained by actuator 232. Valve plug 222 may thus move from the first position (FIGS. 6 and 10) to the second position (FIGS. 7 and 11). Valve plug 222 may close treated water output 204 and restrict water from flowing out of water filter 200. In additional or alternative embodiments, actuator 232 may move (e.g., push, pull, twist, or otherwise directly adjust) valve plug 222 when activated, changed, or adjusted from the first position to the second position.

As described above, actuator 232 may include a shape-memory material, such as a shape-memory alloy. Thus, actuator 232 may be induced to change from the first shape to the second shape according to an input or stimulus. The stimulus may be generated by a heat source. For one example, the heat source is an electrical power supply (e.g., such as power harvesting circuit 214). Power harvesting circuit 214 may be operably coupled with actuator 232 via one or more electrical connections. Power harvesting circuit 214 may then selectively produce or supply an electrical impulse or input to actuator 232 (e.g., the shape-memory wire). The electrical input may generate a temperature change within actuator 232. The temperature change in turn may alter actuator 232 from the first shape to the second shape. It should be understood that additional or alternative heat sources may be utilized to provide the stimulus to actuator 232, and the disclosure is not limited to the examples provided herein.

In some instances, a protective sheath or covering may be provided around actuator 232. For instance, a temperature insulating sleeve (e.g., a polymer sleeve) may be provided around actuator 232. Accordingly, as actuator heats up, the heat may be restricted from being transferred to the water within treated water chamber 207. The sleeve may thus prevent localized instances of water boiling within water filter 200, and may reduce an amount of energy required to reach activation temperature, thus reducing an activation time.

Shutoff valve assembly 220 may include a heating wire 238. For instance, the heat source may include heating wire 238 to provide the stimulus (e.g., heat) to actuator 232. Accordingly, heating wire 238 may be operably connected with actuator 232. Heating wire 238 may include any suitable conducting material sufficient to provide the heat required to adjust actuator 232 from the first shape to the second shape. For one example, heating wire 238 may be made from a nickel-chromium alloy. Accordingly, if the power or electrical input to water filter 200 is insufficient to generate the required heat within actuator 232, heating wire 238 may be added to ensure proper execution of actuator 232.

Figure 12:
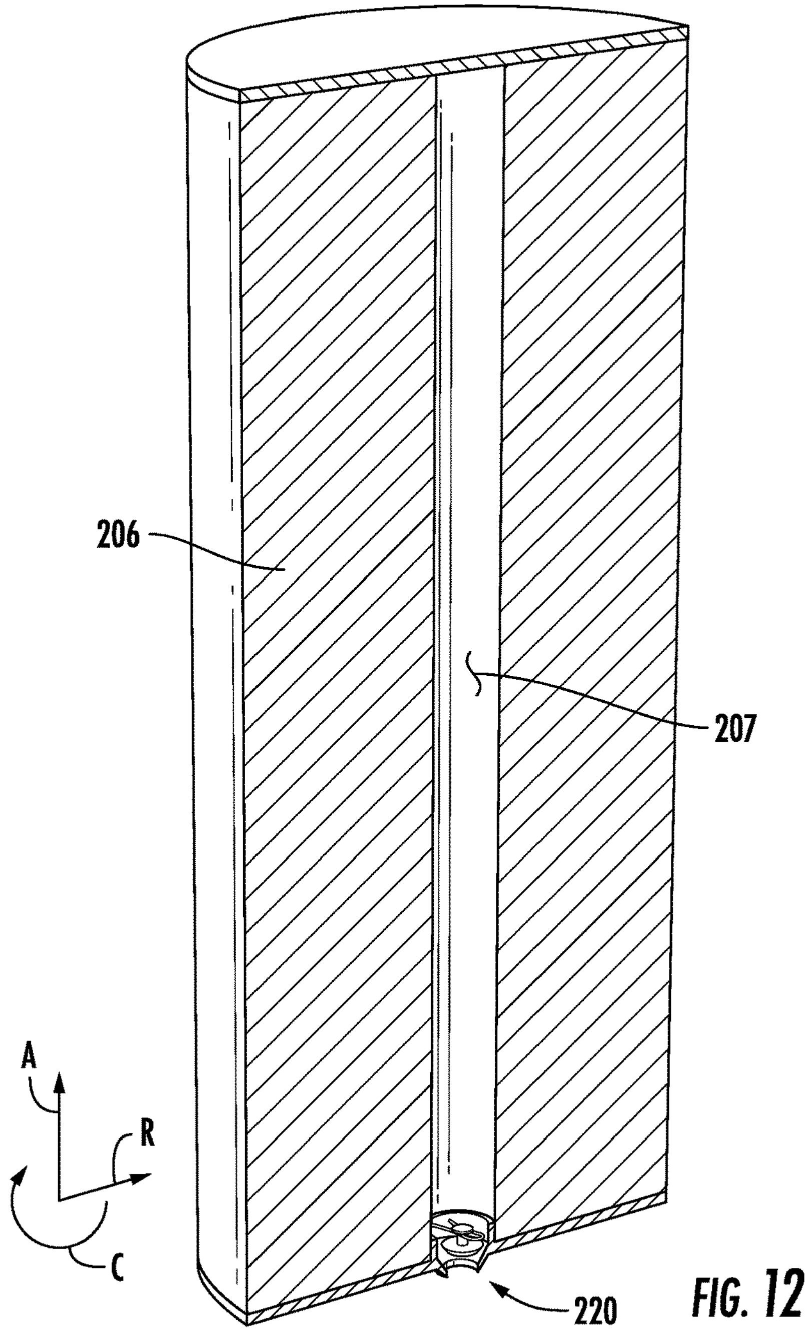
FIG. 12 provides a perspective cut away view of a water filter according to exemplary embodiments of the present disclosure including the valve plug and actuator of FIG. 6.
Figure 13:
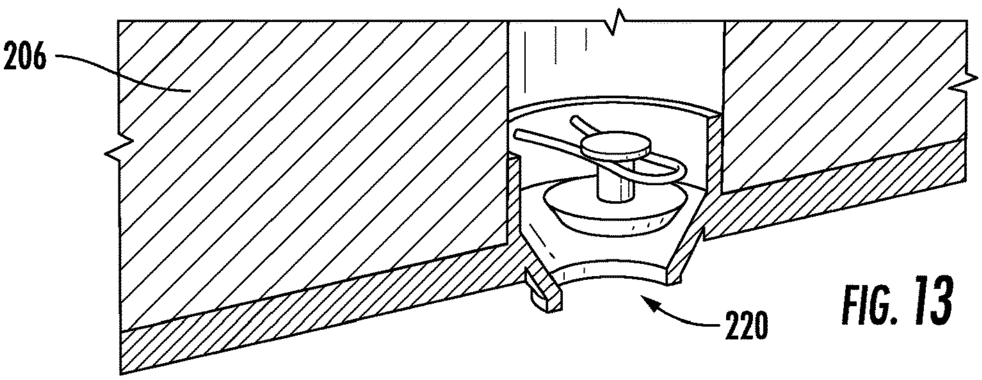
FIG. 13 provides a close-up perspective view of the bottom of the water filter of FIG. 12 including the valve plug in the first position and the actuator in the first shape.

Referring briefly to FIGS. 12 and 13, shutoff valve assembly 220 is shown in an exemplary position within water filter 200. As seen, shutoff valve assembly 220 may be positioned within treated water chamber 207. In particular, shutoff valve assembly 220 may be positioned relatively proximate treated water outlet 204. Accordingly, valve plug 222 may be induced toward treated water outlet 204 according to a number of ways. In some instances, the natural flow of water toward treated water outlet 204 carries valve plug 222 toward treated water outlet 204 (e.g., after actuator 232 is adjusted to the second shape). Additionally or alternatively, valve plug 222 may be urged toward treated water outlet 204 via gravity. In still further embodiments, one or more of a spring, a flap, a diaphragm, a ball valve, or the like may be incorporated to urge, push, direct, or otherwise guide valve plug 222 toward treated water outlet 204 (see FIG. 7).

Figure 14:
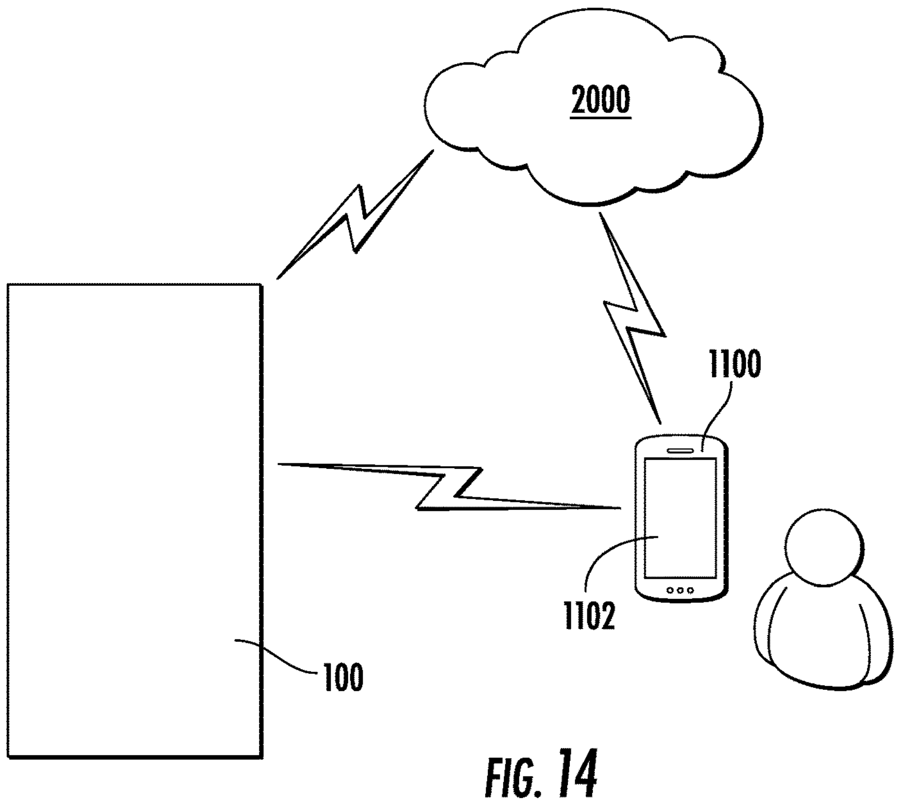
FIG. 14 provides a schematic illustration of an exemplary refrigerator appliance in communication with a remote user interface device according to one or more embodiments of the present disclosure.

FIG. 14 schematically illustrates the refrigerator appliance 100 communicating with a remote user interface device 1100. Also shown (but not numbered) in FIG. 14 is a user such as may interact with the remote user interface device 1100, e.g., via a user interface 1102 of the remote user interface such as a touchscreen in the illustrated embodiment. For example, the remote user interface device 1100 may be a device such as a cell phone, smart phone, smart assistant, or any similar device in operative communication with the controller 134 via a wireless connection. As shown in FIG. 14, the refrigerator appliance 100, and in particular, controller 134 thereof, may be configured to communicate with a separate device external to the appliance 100, such as a communications device or other remote user interface device 1100. The remote user interface device 1100 may be a laptop computer, smartphone, tablet, personal computer, wearable device, smart home system (such as a smart assistant speaker), or various other suitable devices. The refrigerator appliance 100 may include a network communication module, e.g., a wireless communication module, for communicating with the remote user interface device 1100. In various embodiments, a network communication module may include a network interface such that the controller 134 of the refrigerator appliance 100 can connect to and communicate over one or more networks with one or more network nodes. A network communication module may also include one or more transmitting, receiving, or transceiving components for transmitting/receiving communications with other devices communicatively coupled with refrigerator appliance 100. The network communication module may be in communication with, e.g., coupled or connected to, the controller 134 to transmit signals to and receive signals from the controller 134.

As schematically illustrated in FIG. 14, the refrigerator appliance 100 may be configured to communicate with the remote user interface device 1100 either directly or through a network 2000 (e.g., a smart home network). Thus, in various embodiments, the refrigerator appliance 100 and the remote user interface 1100 may be configured to communicate wirelessly with each other or with the network 2000. The network 2000 may be or include various possible communication connections and interfaces, e.g., such as Zigbee, BLUETOOTH®, WI-FI®, or any other suitable communication connection. The remote user interface device 1100 may include a memory for storing and retrieving programming instructions. For example, the remote user interface device 1100 may be a smartphone operable to store and run applications, also known as "apps," and may include a remote user interface provided as a smartphone app. Additionally or alternatively, multiple remote user interface devices 1100 may be connected with refrigerator appliance 100. For instance, one or more smart phones, one or more smart assistant devices (smart speakers), or the like may be simultaneously connected with refrigerator appliance 100 (e.g., through network 2000).

Figure 15:
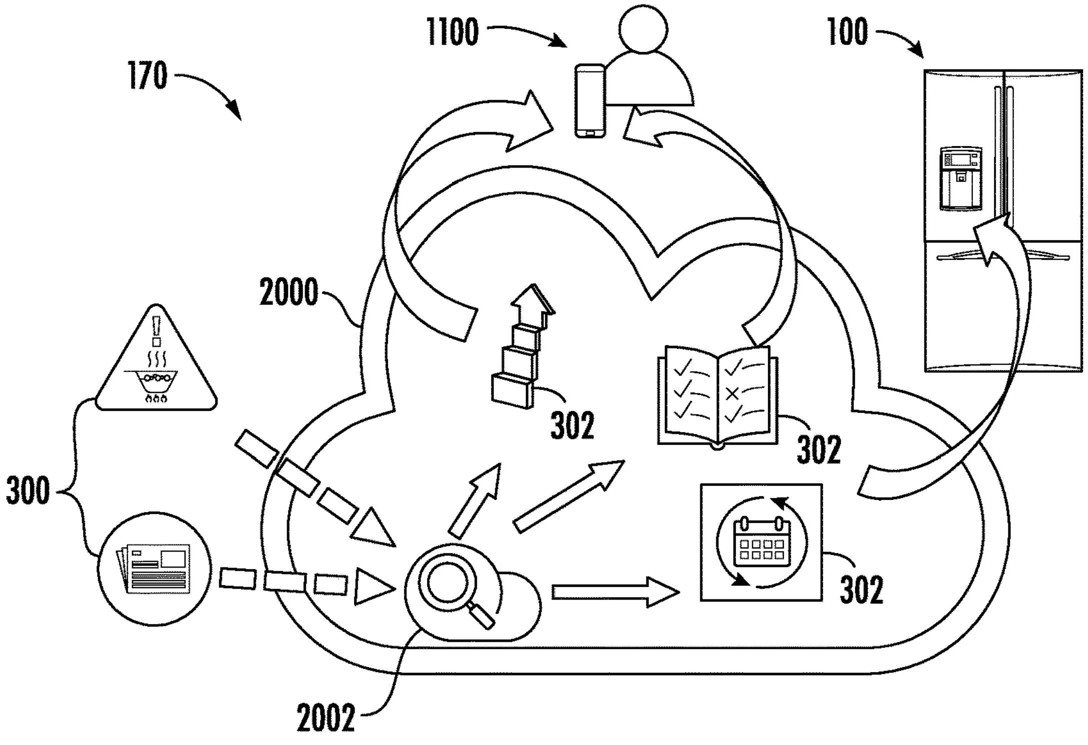
FIG. 15 provides a schematic illustration of an exemplary refrigerator appliance in communication with a remote network according to one or more embodiments of the present disclosure.

FIG. 15 provides a graphical representation of a system 170 including appliance 100 and user interface device 1100. For instance, the system 170 may include network 2000. One or more remote sources 300 (e.g., news sources, social media networks, search engines, etc.) may be connected to network 2000. Thus, information from the one or more remote sources 300 may be selectively provided to appliance 100, user interface device 1100, or additional remote devices. The network may include a remote server 2002. The remote server 2002 may collect, compile, organize, analyze, distribute, etc., the information collected from remote sources 300. Additionally or alternatively, remote server 2002 may develop or otherwise formulate informational data files 302 (e.g., guides, tips, instructions, etc.). The informational data files may be selectively distributed to appliance 100, user interface device 1100, or the like, as will be explained in further detail below.

Figure 16:
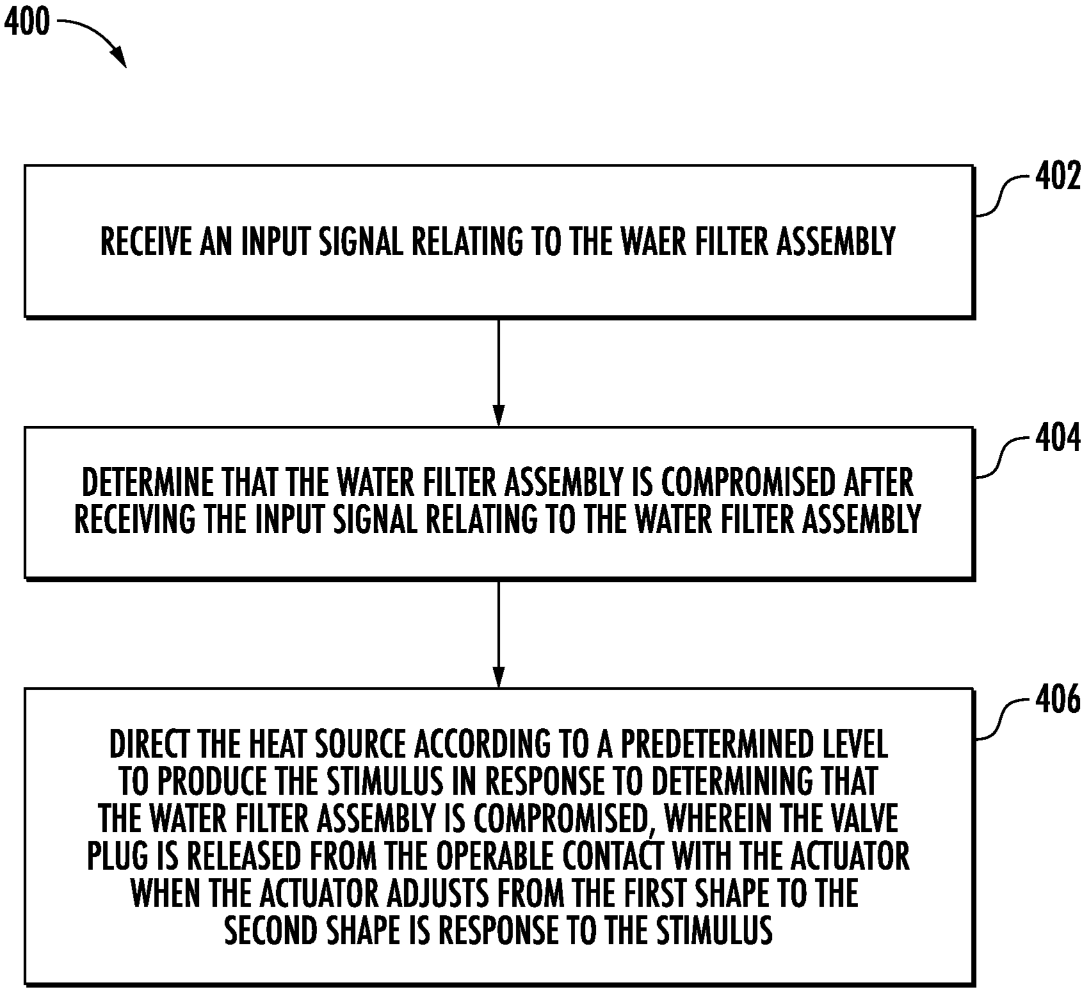
FIG. 16 provides a flow chart illustrating a method of operating a refrigerator appliance.

FIG. 16 depicts a flow diagram of an example method 400 of operating a domestic (e.g., refrigerating) appliance according to a specific embodiment of the present disclosure. The controller 150 of appliance 100 may be configured or programmed to implement method 400. In addition, FIG. 16 depicts steps performed in a particular order for purposes of illustration and discussion. Those of ordinary skill in the art, using the disclosures provided herein, will understand that the steps of any of the methods disclosed herein may be modified, adapted, expanded, omitted, and/or rearranged in various ways without deviating from the scope of the present disclosure. Additionally or alternatively, a separate dedicated controller may be configured to perform method 400. Further still, method 400 may be applied to any suitable domestic appliance configured to supply water (e.g., liquid water, ice, etc.) to one or more users (e.g., a stand-alone ice dispenser, a stand-alone beverage dispenser, a water cooler, etc.).

At step 402, method 400 may include receiving an input signal relating to the water filter assembly. For instance, the input signal may include information from one or more remote sources relating to a quality of water from a municipal water supply to the water supply inlet of the appliance (or to the water filter assembly). In detail, the appliance (e.g., refrigerator appliance 100) may, through a wireless connection to a wireless network, receive at least one informational notification regarding a potential or impending water advisory, such as a boil water advisory. The remote sources may include local or regional news channels or outlets, utilities agencies, health boards, social media networks (e.g., Twitter®, Facebook®, etc.), community message boards, or the like. For instance, the controller of the appliance may periodically scan the one or more remote sources for information relating to water quality issues. Additionally or alternatively, the appliance may include one or more algorithms configured to retrieve or import water-quality specific alerts from the one or more sources.

The one or more remote sources may include a separate remotely connected appliance. For instance, a plurality of appliances may be interconnected via a cloud or wireless network, for example through a remote server. The plurality of appliances may be provided remotely to each other (e.g., in different households or physical locations). Additionally or alternatively, each of the plurality of appliances may belong to or be registered to different unique users. Accordingly, a first remote appliance may receive an input regarding a water quality issue directly from a user. For example, a first user associated with the first remote appliance independently discovers the water quality issue and inputs the discovered information to the first remote appliance. The first remote appliance may then upload the water quality issue to the remotely connected server or cloud. The remotely connected server or cloud may then distribute or communicate the water quality issue to a second remote appliance. Additionally or alternatively, the input signal may include a usable life of the water filter or water filter assembly. For instance, the input signal may be a signal that the water filter is expired and needs to be changed.

At step 404, method 400 may include determining that the water filter assembly is compromised after receiving the input signal relating to the water filter assembly. As mentioned above, the input signal may include one or more of a boil water advisory, a health advisory, a containment issue, an expiration date of the water filter, or the like. Accordingly, method 400 may determine that the filter is no longer effective at producing filtered water up to a required standard.

At step 406, method 400 may include directing the heat source to a predetermined level to produce a stimulus. In detail, after determining that the water filter is compromised, method 400 may shut off, close off, or otherwise deactivate the water filter. The heat source (or electrical input) may be directed to produce and provide heat to an actuator (e.g., actuator 232) to adjust from a first position to a second position (e.g., as described above). Upon adjusting from the first position to the second position, a valve plug (e.g., valve plug 222) may be released within the water filter to plug an outlet (or an inlet) of the water filter, effectively rendering the water filter unusable.

In some instances, the stimulus includes the electrical input or impulse to the actuator, The electrical input may include a voltage level and a current level. For instance, some systems may incorporate a fixed voltage level of electrical inputs while varying current levels. Similarly, some systems may incorporate a fixed current level of electrical inputs while varying voltage levels. Method 400 may include determining that at least one of the voltage level or a current level through the actuator has changed by a predetermined amount. For instance, one or more sensors (e.g., resistors) may be included and electrically connected with the actuator to sense, measure, or otherwise determine the voltage or current levels within the actuator. The changing of the voltage or current level may signify that the actuator has successfully adjusted from the first shape to the second shape.

Upon determining that at least one of the voltage or current levels has changed by the predetermined amount, method 400 may conclude that the actuator has successfully adjusted and the valve plug has been released within the water filter. Accordingly, method 400 may direct the heat source to an off position. For instance, method 400 may stop the electrical input to the actuator or otherwise stop producing heat at the actuator (e.g., via the heat source, the electrical power supply, the heating wire, etc.). Advantageously, power may be saved after immediately determining the completion of the actuator shape change.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly for a domestic appliance, the water filter assembly defining an axial direction, a radial direction, and a circumferential direction, the water filter assembly comprising:

a filter housing defining a filter chamber, a feed water inlet, and a treated water outlet;

a filter element received within the filter chamber defining a feed water chamber and a treated water chamber;

a valve plug positioned within the filter housing, the valve plug being movable from an unplugged position to a plugged position; and an actuator assembly in operable contact with the valve plug, wherein the actuator assembly comprises a shape-memory material configured to adjust from a first shape to a second shape in response to an electrical stimulus, and wherein the valve plug is in the unplugged position when the shape-memory material is in the first shape and the valve plug moves to the plugged position when the shape-memory material is transformed into the second shape.

2. The water filter assembly of claim 1, further comprising:

an electric power supply in operable communication with the actuator assembly; and a controller operably connected to the electric power supply, the controller being configured to perform an operation, the operation comprising:

receiving an input signal relating to the water filter assembly;

determining that the water filter assembly is compromised after receiving the input signal relating to the water filter assembly; and directing the electric power supply according to a predetermined level to produce the electrical stimulus in response to determining that the water filter assembly is compromised, wherein the valve plug is moved from the unplugged position to the plugged position when the shape-memory material adjusts from the first shape to the second shape in response to the electrical stimulus.

3. The water filter assembly of claim 2, wherein the operation further comprises:

determining that at least one of a voltage or a current through the actuator assembly has changed by a predetermined amount; and directing the electric power supply to an off position.

4. The water filter assembly of claim 1, further comprising:

an insulating sleeve positioned around the shape-memory material.

5. The water filter assembly of claim 1, wherein the valve plug comprises:

a plug base;

a stem extending from the plug base along the axial direction; and a plug head provided at a distal end of the stem, wherein a head diameter of the plug head is greater than a stem diameter of the stem.

6. The water filter assembly of claim 5, wherein the actuator assembly comprises a shape-memory wire comprising a first leg disposed on a first side of the valve plug and a second leg disposed on a second side of the valve plug opposite the first leg.

7. The water filter assembly of claim 6, wherein a distance between the first leg and the second leg of the actuator assembly is less than the head diameter when the actuator assembly is in the first shape, and the distance between the first leg and the second leg of the actuator assembly is greater than the head diameter when the actuator assembly is in the second shape.

8. The water filter assembly of claim 6, wherein each of the first leg and the second leg contacts an under surface of the plug head when the actuator assembly is in the first shape.

9. The water filter assembly of claim 1, wherein the valve plug is suspended within the treated water chamber via the actuator assembly proximate the treated water outlet when the actuator assembly is in the first shape.

10. The water filter assembly of claim 1, further comprising:

a heating wire operably connected with the shape-memory material and configured to provide a predetermined amount of heat to the shape-memory material.

11. A domestic appliance comprising:

a cabinet forming a receiving space;

a water supply inlet provided on the cabinet and through which water is supplied to the receiving space from an external water supply; and a water filter assembly defining an axial direction, a radial direction, and a circumferential direction, the water filter assembly being in fluid communication with the external water supply, the water filter assembly comprising:

a filter housing defining a filter chamber, a feed water inlet, and a treated water outlet;

a filter element received within the filter chamber defining a feed water chamber and a treated water chamber;

a valve plug positioned within the filter housing;

an actuator assembly in operable contact with the valve plug, wherein the actuator assembly comprises a shape-memory material configured to adjust from a first shape to a second shape in response to a stimulus;

an electric power supply in operable communication with the actuator assembly; and a controller operably connected to the electric power supply, the controller being configured to perform an operation, the operation comprising:

receiving an input signal relating to the water filter assembly;

determining that the water filter assembly is compromised after receiving the input signal relating to the water filter assembly; and directing the electric power supply according to a predetermined level to produce the stimulus in response to determining that the water filter assembly is compromised, wherein the valve plug is moved from an open position to a closed position when the actuator assembly adjusts from the first shape to the second shape in response to the stimulus.

12. The domestic appliance of claim 11, wherein the stimulus from the electric power supply is converted to thermal energy within the actuator assembly to increase a temperature of the shape-memory material.

13. The domestic appliance of claim 11, further comprising:

an insulating sleeve positioned around the shape-memory material.

14. The domestic appliance of claim 11, wherein the valve plug comprises:

a plug base;

a stem extending from the plug base along the axial direction; and a plug head provided at a distal end of the stem, wherein a head diameter of the plug head is greater than a stem diameter of the stem.

15. The domestic appliance of claim 14, wherein the actuator assembly comprises a shape-memory wire comprising a first leg disposed on a first side of the valve plug and a second leg disposed on a second side of the valve plug opposite the first leg.

16. The domestic appliance of claim 15, wherein a distance between the first leg and the second leg of the shape-memory wire is less than the head diameter when the actuator assembly is in the first shape, and the distance between the first leg and the second leg of the shape-memory wire is greater than the head diameter when the actuator assembly is in the second shape.

17. The domestic appliance of claim 15, wherein each of the first leg and the second leg contacts an under surface of the plug head when the actuator assembly is in the first shape.

18. The domestic appliance of claim 11, wherein the valve plug is suspended within the treated water chamber via the actuator assembly proximate the treated water outlet when the actuator assembly is in the first shape.

19. The domestic appliance of claim 11, wherein the operation further comprises:

determining that at least one of a voltage or a current through the actuator assembly has changed by a predetermined amount; and directing the electric power supply to an off position.

20. The domestic appliance of claim 11, wherein the water filter assembly further comprises:

a heating wire operably connected with the shape-memory material and configured to provide a predetermined amount of heat to the shape-memory material.

* * * * *